(12) United States Patent
Beyer

(10) Patent No.: US 7,513,362 B2
(45) Date of Patent: Apr. 7, 2009

(54) PROTECTIVE CASE FOR DISK SHAPED DATA CARRIERS

(75) Inventor: Hans-Joergen Beyer, Rottenburg (DE)

(73) Assignee: Hans-Jörgen Beyer, Rottenburg (DE)

( * ) Notice: Subject to any disclaimer, the term of this patent is extended or adjusted under 35 U.S.C. 154(b) by 206 days.

(21) Appl. No.: 11/399,337

(22) Filed: Apr. 7, 2006

(65) Prior Publication Data

US 2007/0084738 A1    Apr. 19, 2007

Related U.S. Application Data

(60) Provisional application No. 60/669,908, filed on Apr. 11, 2005.

(51) Int. Cl.
*B65D 85/30* (2006.01)

(52) U.S. Cl. .................. 206/312; 206/308.1

(58) Field of Classification Search ............... 206/45.2, 206/308.1, 309, 311–313; 40/124.14–124.16; 248/174
See application file for complete search history.

(56) References Cited

U.S. PATENT DOCUMENTS

| | | | | |
|---|---|---|---|---|
| 2,323,245 | A * | 6/1943 | Schenker | 206/311 |
| 3,057,470 | A * | 10/1962 | Heiber | 206/309 |
| 3,549,225 | A * | 12/1970 | Scaccia | 206/312 |
| 5,641,063 | A * | 6/1997 | Gambardella et al. | 206/312 |
| 5,901,844 | A * | 5/1999 | Gambardella et al. | 206/308.1 |
| 6,059,101 | A * | 5/2000 | Gambardella et al. | 206/308.1 |
| 6,419,082 | B1 * | 7/2002 | Frankeny | 206/308.1 |
| 6,505,737 | B1 * | 1/2003 | Sherman | 206/308.1 |
| 6,758,333 | B2 * | 7/2004 | Sherman | 206/308.1 |
| 6,799,678 | B2 * | 10/2004 | Sherman | 206/308.1 |

* cited by examiner

*Primary Examiner*—Bryon P Gehman
(74) *Attorney, Agent, or Firm*—Renner, Otto, Boisselle & Sklar, LLP

(57) ABSTRACT

A protective case for a disc shaped data carrier has at least two moving, opposing side components. The protective case encloses the data carrier in its closed state and, through movement of the two side components relative to each other, can be brought into an open state in which the data carrier can be removed from the protective case. The data carrier is held against the two side components In an inclined position, so that at least a part of it is accessible from both sides.

8 Claims, 4 Drawing Sheets

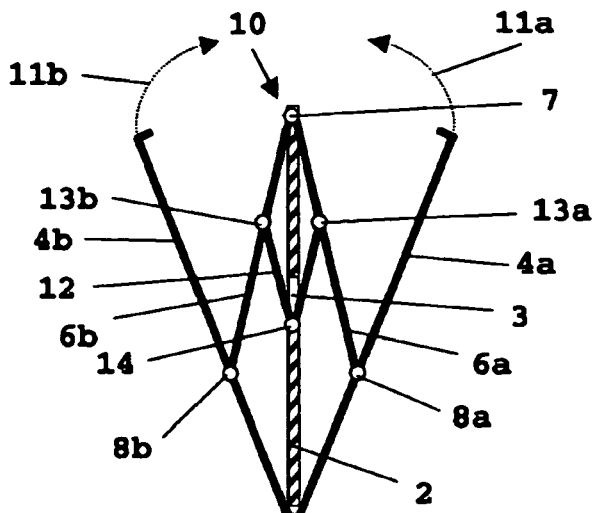
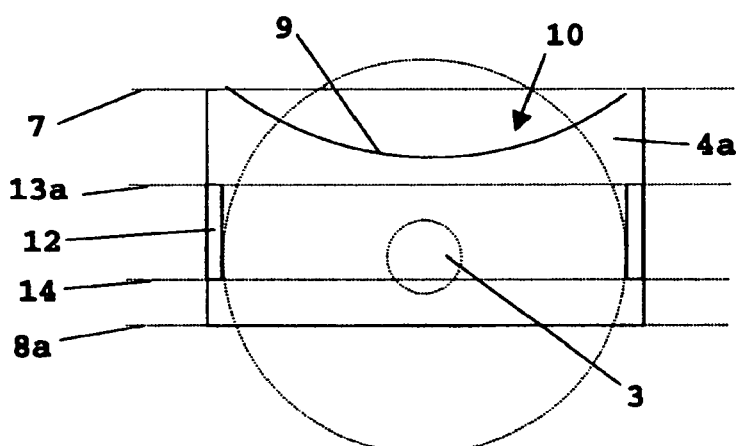
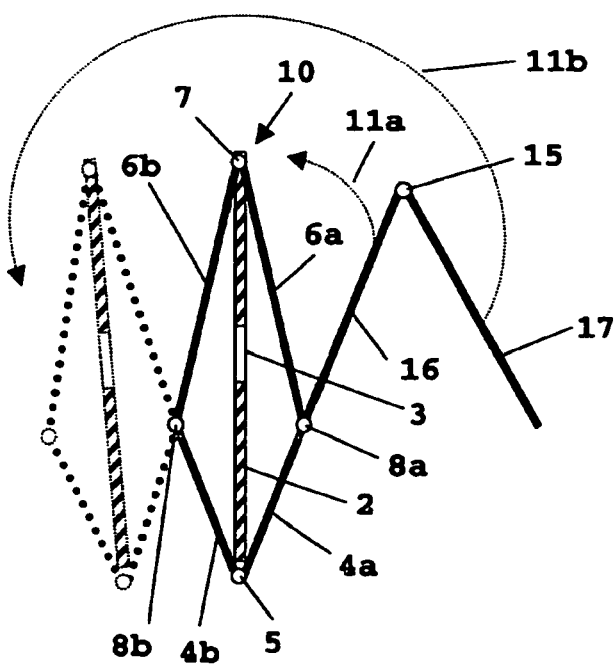

1

PROTECTIVE CASE FOR DISK SHAPED DATA CARRIERS

This application claims benefit of 60/669,908 filed on Apr. 11, 2005 the entire disclosure of which is hereby incorporated by reference.

BACKGROUND OF THE INVENTION

The invention relates to a protective case for a disk shaped data carrier in accordance with the independent claim.

Disk shaped data carriers, particularly CDs and records or DVDs, have a surface area on at least one side on which data are stored. This area is particularly susceptible to contamination and damage. As a result, protective cases are known for data carriers of this type. At the same time, it frequently occurs that the user does not find it particularly easy to insert data carriers into the corresponding cases or to remove them therefrom.

Known protective cases consist of a base component and a lid which swivels on the base component. The data carrier is thereby disposed on the base component so that the above described surface area usually faces the base component, in order to protect it. It can be gripped by parts of the rim on opposite sides for removal. In order to prevent the data carrier from unintentionally falling out, the base component often has a locking device which grips a hole in the center of the data carrier and secures it to the base component. To remove the data carrier, it is usually gripped with the thumb and forefinger of one hand, while the locking device must still be simultaneously released.

Document U.S. Pat. No. 3,549,225 describes a protective case for a disk shaped data carrier with two opposing, pivoting side components with an insertion opening which moves relative to the data carrier when the protective case is opened.

Document DE 197 28 263 A1 describes a similar protective case for disk shaped data carriers with a rhombus-shaped insertion opening.

SUMMARY OF THE INVENTION

The purpose of the invention is to improve a protective case for a disk shaped data carrier in such a way that it is easy to remove and reinsert when the protective case is open.

This purpose is achieved with a protective case for a disc shaped data carrier having at least two moving, opposing side components. The protective case encloses the data carrier in its closed state and, through movement of the two side components relative to each other, can be brought into an open state in which the data carrier can be removed from the protective case. The data carrier is held against the two side components in an inclined position, so that at least a part of it is accessible from both sides.

BRIEF DESCRIPTION OF THE DRAWING

The invention is described below by way of example, with reference to a series of schematic drawings, in which:

FIG. 3 depicts a side view of the protective case as per FIG. 1 in a closed state;

FIG. 4 depicts a schematic plan view of a storage component from FIG. 3;

FIG. 5 depicts a side view of an example of another version of a protective case in a largely closed state.

DESCRIPTION OF THE PREFERRED EMBODIMENT

Figure 1:
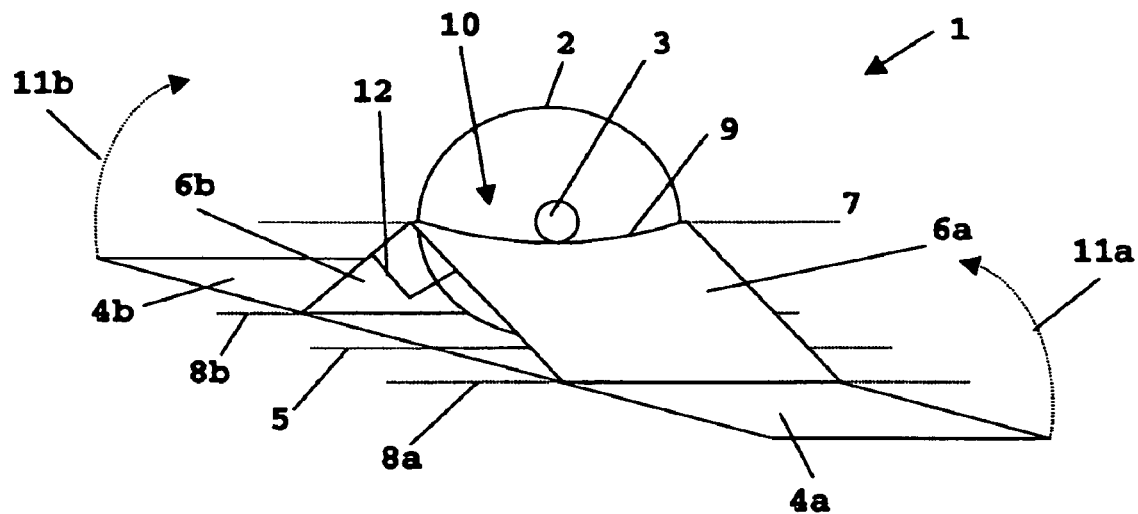
FIG. 1 Is a perspective representation depicting the design principle of a protective case in the open state.

FIG. 1 depicts a general view of a protective case 1 which serves to accommodate an essentially disc shaped data carrier 2. The data carrier 2 may preferably be a so-called CD, but this term may also relate to DVDs, records or correspondingly shaped data carriers.

No data are stored in the marginal area between the data storage area and the outer rim of the data carrier 2. These areas, therefore, are relatively invulnerable to contamination and damage. The data storage area, by contrast, should be protected from manual Influences to the utmost extent.

The protective case 1, shown in the open state, has two side components 4a, 4b which hinge about a common axis 5. In addition, two storage components 6a, 6b are provided, which are connected to each other by an axis 7 and which can be pivoted relative to each other. Moreover, the storage components 6a, 6b are each connected in a hinged manner to one of the side components 4a, 4b by further axes 8a, 8b respectively. The connection of the two storage components 6a, 6b is not continuous in the area of axis 7. Instead, one of the storage components 6a, 6b (or both) has a recess 9, so as to define an Insertion opening 10 to accommodate the data carrier 2. The embodiment shown has an essentially elliptical insertion opening 10, whose longitudinal half-axis extends in the direction of axis 7.

When the data carrier 2 is Inserted into this insertion opening 10 (with the protective case 1 open), its rim comes into contact with the insertion opening 10 and with the protective case 1 in the area of axis 5 and is consequently held in an essentially vertical position. When the case 1 is closed, the two side components 4a, 4b pivot about axis 5 (as indicated by the arrows 11a, 11b). As a result of the connection of the two storage components 8a, 8b with the related side components 4a, 4b by way of axes 8a, 8b, and axis 7, the protective case 1 automatically shifts the position of the side components a, b and storage components 6a, 6b relative to each other when the protective case 1 is closed. In this process, axis 7 moves upwards relative to axis 5. As a result, the insertion opening 10 is displaced relative to the data carrier 2 in such a way that the data carrier 2 is progressively enclosed by the two storage components 6a, 6b. In the closed condition, the side components 4a, 4b and storage components 6a, 6b are then essentially positioned parallel to each other and parallel to the data carrier 2.

In the case of circular data carriers 2, the rim is no longer in contact with the insertion opening 10 when the protective case 1 Is closed, since the insertion opening 10 shifts upwards relative to the data carrier 2 and the effective width of the data carrier 2 diminishes In the upward direction. In order to restrict sideways movement of the data carrier 2, additional retainers 12 can accordingly be arranged on each side.

When the protective case 1 is opened, the two side components 4a, 4b once more pivot away from each other about axis 5. In this process, the two storage components 6a, 6b automatically move with them in such a way that, with the progressive opening of the protective case 1, the data carrier 2 projects from the insertion opening 10. It is preferable for the relative lengths of the individual components and the size of the recesses 9 to be matched up in such a way that the data carrier 2 projects out of the insertion opening 10 (when the case 1 is opened) to such an extent that it can easily be removed. It is ideally preferable for the hole 3 also to be easily accessible.

Figure 2:
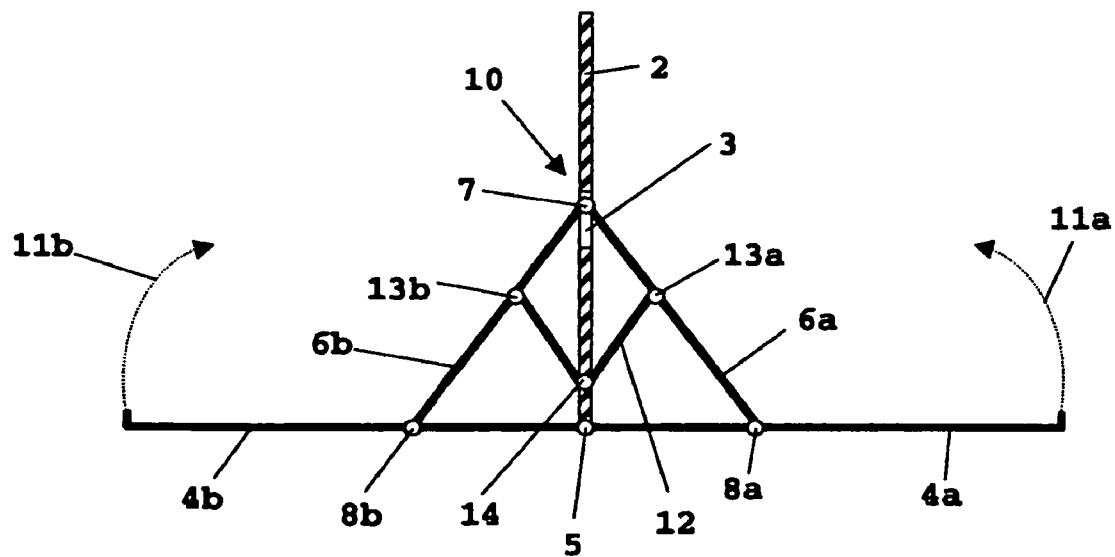
FIG. 2 depicts a side view of the protective case as per FIG. 1 in a fully open state.

In FIGS. 2 and 3, side views of the protective case are shown in the open and nearly closed states, wherein the same components are marked with the same reference numbers. The axes are each represented by small circles. The vertical position of the data carrier 2 is defined by axis 5 in the positions shown. When the protective case 1 is closed, the two storage components 6a, 6b travel upwards relative to axis 5 and also to the data carrier 2, together with a retainer 12 if appropriate.

FIG. 4 again depicts one storage component 6a in plan view. For orientation purposes, the position in which the data carrier 2 can be located in the protective case when closed is shown with a dotted line. The rim of the data carrier 2 is no longer in contact with the closed ends of the insertion opening 10 and could consequently move In the horizontal direction. The insertion opening 10 must be of sufficient size to permit the entire width of the data carrier 2 to be inserted into the insertion opening 10. In order to restrict or prevent any lateral movement of the data carrier 2 when inserted, retainers 12 can be provided on both sides in the example shown, a retainer 12 is formed by part of the storage component (shown as a rectangle in FIG. 4) which, in the area of axis 13a remains connected to the storage component 4a and, at the same time, is connected to the corresponding part of the identical, diametrically opposed part of the storage component 4b (not shown) for pivoting about a further axis 14.

Other forms of retainers 12 are likewise possible. For example, spring-type elements can be arranged on the side components 4a, 4b and/or storage components 6a, 6b as a means of forming a lateral retainer 12 for the data carrier. It is also possible to form a retainer 12 by way of suitable folds.

In each case, the drawing depicts only the principle of the protective case 1 complying with the invention. Needless to say, other side components, closures and accessories can, or must, be provided. Axis 5, for example, must be configured in such a way that the data carrier 2 is not squeezed between the two side components 4a, 4b but continues to rest freely on axis 5 in the stored position. Basic elements of this type of protective case 1, however, are known in the art and, as a result, will not be explicitly presented or described any further in this document. It is preferable for the protective case 1 to be configured with an essentially V-shaped recess in cross section in the area of axis 5, so that the data carrier 2 is held in this recess. If it is wished to facilitate the insertion of the data carrier still further, an additional element (not shown) can be provided which extends from axis 5 in the essentially V-shaped recess up to the storage components 6a, 6b to which, it is connected in a hinged manner. In this way, the data carrier 2 is automatically guided into the correct position when inserted into the insertion opening 10.

Any type of material can also be used, subject to its being suitable for the intended purpose. Conventional side components 4a, 4b, for example, are frequently made of transparent plastic. The use of cardboard or paper is also known.

In the drawing, the two storage components 6a, 6b are continuous and are depicted in essentially rectangular form. Needless to say, openings or recesses can also be envisioned and different shapes may also be used.

The only decisive factor is merely that a suitable insertion opening 10 should be formed by the storage components 6a, 6b and a connection between axes 5, 7, 8a, 8b assured, so that the insertion opening 10 moves relative to the data carrier 2 when the protective case 1 is opened and closed and that, in this way, the data carrier is brought into the desired, easily accessible position.

In the simplest case, axes 5, 7, 8a, 8b, 13a, 13b, 14 and/or 15 can take the form of a crease (if paper or cardboard is used) or as a folding joint (for plastic). In addition, notches, areas of reduced material thickness, hinges with hinge pins and bearings or corresponding devices can also be used. Elements of this type are also known in the art. Needless to say, even more elaborate hinges can be used.

In a particularly simple version, the storage components 6a, 6b and, if appropriate, retainers 12 can be used as the internal component of conventional protective cases 1. In this case, the two storage components 6a, 6b are made from one piece, connected by way of a folding point along axis 7. At the same time, It is preferable for the Insertion opening 10 to be symmetrical to axis 7. The two storage components 6a, 6b can then be connected to the two side components 4a, 4b by way of axes 8a, 8b. Alternatively, two additional internal components (not shown) can be provided which run parallel to the side components 4a, 4b and which, together with the two storage components 6a, 6b and axes 5, 7, 8a and 8b, form a rhombus shape In cross-section. The internal components can then be connected to the side components 4a, 4b, either permanently or such that they can be detached. Alternatively, the internal components can also be made to a suitable size so that they can be placed on the side components 4a, 4b from the inside and, in this way, fixed in position relative to the side components 4a, 4b.

In the embodiments shown, the insertion opening 10 is similar to an ellipse in shape. The ratio of the primary axis to the secondary axis of the ellipse should preferably be greater than 2, so as to produce an elongated shape. A decisive functional factor is the shape of the insertion opening 10 at the point of intersection of the primary axis and the material confining it at each end. As a consequence of the elliptical shape, the data carrier 2 (when inserted) is provided with a guide on each side so that it is unable to tip over sideways. Overall, the insertion opening 10 is shaped in such a way that the data carrier 2 is held In a vertical or Inclined position with only its rim in contact with the edges of the insertion opening 10. In this way, damage to the data storage area of the data carrier 2 is avoided.

The length of the secondary axis X is uncritical, subject to the provision that the data storage area of the data carrier 2 does not come Into contact with the edges of the insertion opening 10. Preferably, the chosen size of the secondary axis X is such that the hole 3 in the data carrier 2 can still be easily reached with a finger for the purpose of removing the data carrier 2 from the protective case 1.

Needless to say, all possible shapes formed at the intersections of the primary axis and edges of the Insertion opening 10 (preferably similar to an ellipse or, if appropriate, similar only in certain segments), and consequently capable of assuring the necessary lateral retaining function for the data carrier 2, are suitable for the insertion opening 10.

To accommodate additional data carriers, the insertion opening 10 can also be formed in such a way that the basic elliptical shape in the area of axis 7 is enlarged and extended by a number of segments in such a way that the insertion opening can accommodate a number of data carriers.

The protective case 1 can also be integrated into other items of equipment, as is already known from e.g. document FR 777080 A. Preferably, these are machines which are used in combination with data carriers 2 such as computers, monitors and CD or DVD players.

Known data carriers 2 are usually circular in shape and of minimal thickness, corresponding to the examples shown. The term "disk shaped data carriers" used within the meaning of the invention should not, however, be confined to these known data carriers 2. The invention can also be appropriately used for data carriers of different designs.

The design of the protective case 1 should preferably be such that contact is prevented between the data storage area and the confines of the disk storage space 10 while, at the same time, the data carrier 2 is held in an inclined position facing the two side components 4a, 4b (when the case is open), so that a certain proportion is accessible on both sides, and the data carrier 2 assumes the desired end-position of its own accord without any necessity for it to be precisely positioned in the insertion opening 10, with the result that the data carrier 2 can be withdrawn from the protective case 1 without the data storage areas being touched.

The extent to which the data carrier 2 projects from the insertion opening 10 in the open condition can be adapted to the needs of the individual case. The size of the recess 9 can vary and, in particular, be widened in the area of the hole 3 in the data carrier 2, so that it can be more easily removed.

A second example of a protective case complying with the invention is shown in FIG. 5, wherein the same components are identified with the same reference numbers. Departing from the first embodiment, the respective side components 4a, 4b extend only as far as axis 8a, 8b. In other words, the storage components 6a, 6b form congruent parts of the respective side components 4a, 4b, which are configured in a hinged manner in the area of axes 8a, 8b. This means that the storage components 6a, 6b need not necessarily be enclosed by the respective side components 4a, 4b, but themselves form part of the outer casing. Otherwise than this, the construction and function correspond to the first example. In addition, retainers (not shown) can also be provided.

Since, in this case, the insertion opening 10 is not enclosed by the side components 4a, 4b or, as a result, protected against failing out when the protective case is closed, some form of closure can also be provided. In this connection, in FIG. 5, a two-piece closure 16, 17 with a further axis 15 is proposed, which is connected to axis 8a in a hinged manner. To close the insertion opening 10, this closure 16, 17 is folded (like an envelope) over the insertion opening 10 in the direction of arrows 11a, 11b and, if necessary, secured to the storage component 6b on the other side. In this connection, any form of closure can be used, e.g. in the form of a lug and slot, a Velcro fastener, an adhesive sticker or similar. The closures 16, 17 can be used when the protective case 1 is opened by essentially tugging in the horizontal direction on axis 8a, thereby pivoting the storage components 6a, 6b in opposition to the side components 4a, 4b, so that the data carrier 2 projects from the insertion opening 10 and can be removed. In a similar manner to the closure 16, 17, a retaining clip (not shown) or the like can be arranged on the other side.

With this configuration, a multi-compartment protective case can also be realized, as indicted by the section shown with dotted lines in FIG. 5. Further sections can be added in a corresponding manner, resulting in the overall shape of a concertina. The closure 16, 17 can either be used unchanged or readily adapted to the circumstances, typically with several sections and, if necessary, by arranging a further locking element (not shown) between the closure components 16 and 17 which compensates for the horizontal extension of the sections. An advantage of a multi-compartment protective case 1 of this type is that these can rest independently on two or more axes 5. In addition, an arrangement of this type can form part of further cases, folders, etc.

FIGS. 6, 7, 8 and 9 depict alternative configurations of the protective case 1.

Figure 6:
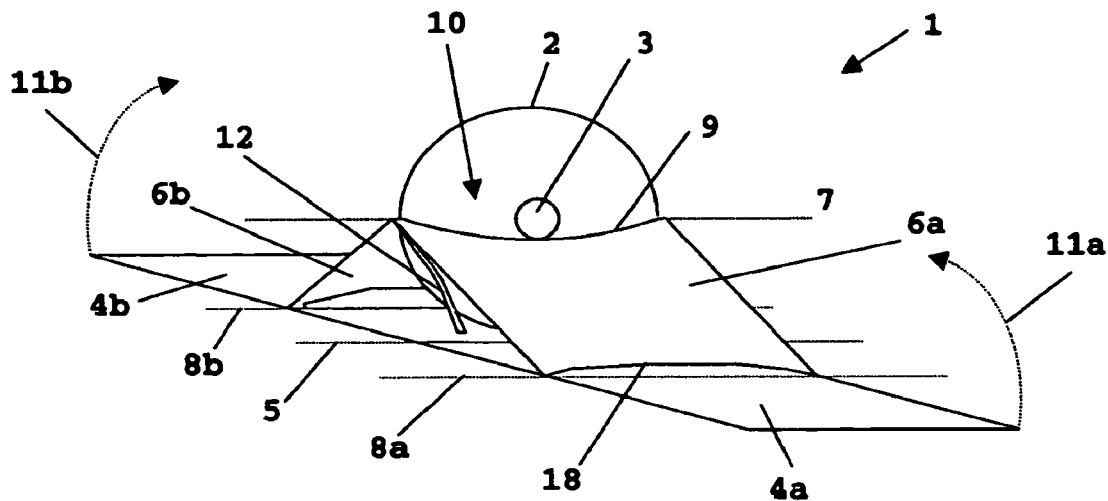
FIGS. 6-9 depict examples of further versions of protective cases in accordance with the invention.

By comparison with the first version shown in FIG. 1, the configuration shown in FIG. 6 exhibits two differences. One of these is that the retainer 12 takes the form of a leaf spring positioned on the storage components a/b In the area of axis 7. Typically, the retainer 12 can consist of a flexible plastic strip which is bent into the requisite, slightly curved shape. This strip can either form part of the storage components 6a/6b or be bonded, welded or secured In another manner to the undersides of the storage components 6a/6b.

As regards the length of the leaf springs, it is important for the unattached ends of the said springs to be positioned at approximately the same height as the hole 3 in the data carrier 2 when the protective case is closed. In this way, the retainer 12 will perform its function most effectively, namely that of preventing the data carrier 2 from slipping sideways relative to the protective case 1.

The second difference is that one edge 18 of the storage components 6a/6b is configured in such a way that the storage components 6a/6b are only in contact with axes 8a, 8b at their extremities. The hinged connection of the side components 4a/4b with the storage components 6a/6b is also formed at these points. That part of the edge 18 of the storage components 6a/6b is shaped in such a way as to provide a space between it and axes 8a/8b, so that booklets, other data carriers or printed material can be inserted into it. Booklets of this type, in particular, are customary in the case of commercially traded music CDs.

Figure 7:
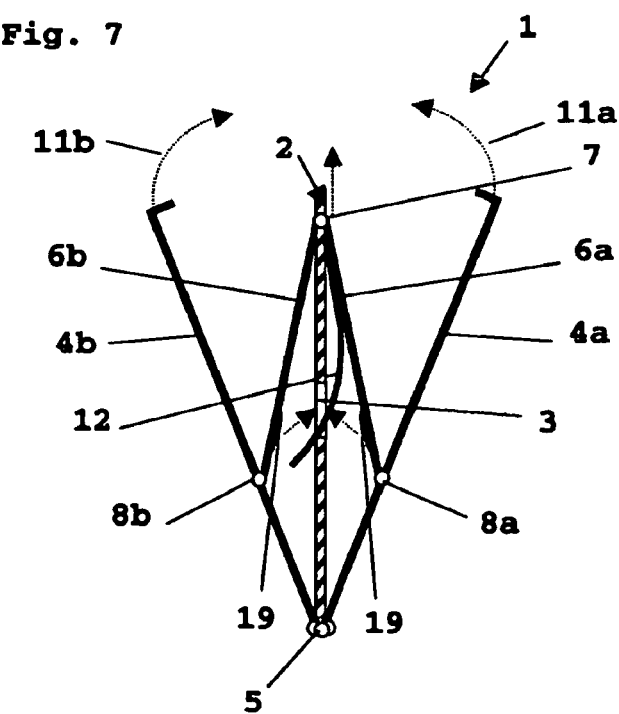

FIG. 7 depicts a side view of a further version of a protective case in accordance with the Invention. In this example, the retainer 12 also takes the form of a type of leaf spring.

The function of this retainer 12 can clearly be seen from FIG. 7.

A further distinctive feature of this third version is that cushions 19 are provided on the sides of the storage components 6a/6b facing the data carrier 2. These cushions 19 are positioned in such a way that, with the protective case 1 closed, they come to rest on the data carrier 2 in the area of the hole 3 in the data carrier 2 and, if necessary, additionally or exclusively engage the hole 3 in the data carrier 2. In this way, the data carrier 2 is locked in position so that, here again, any contact between the protective case 1 and the data carrier 2 should occur only in those areas in which no data are stored on the data carrier 2. As previously mentioned, these areas (which are not critical to the storage function), are located on the outer rim of the data carrier 2 and in the immediate vicinity of the hole 3 in the data carrier 2. The cushions 19 may be made of soft plastic, gel or foam, or consist of air cushions, or be made of other preferred materials of appropriate conformability. If hard materials are used, it is advantageous for them to be located to fix the hole 3 In the data carrier 2.

The cushions 19 can either be attached to the storage components 6a/6b as extra components or form an integral part of the storage components 6a/6b. When the protective case 1 is closed, the data carrier 2 must be securely located in the area of the hole 3, yet the forces exerted by the cushion 19 on the data carrier 2 must not damage the data carrier 2, either physically or in any other way.

Figure 8:
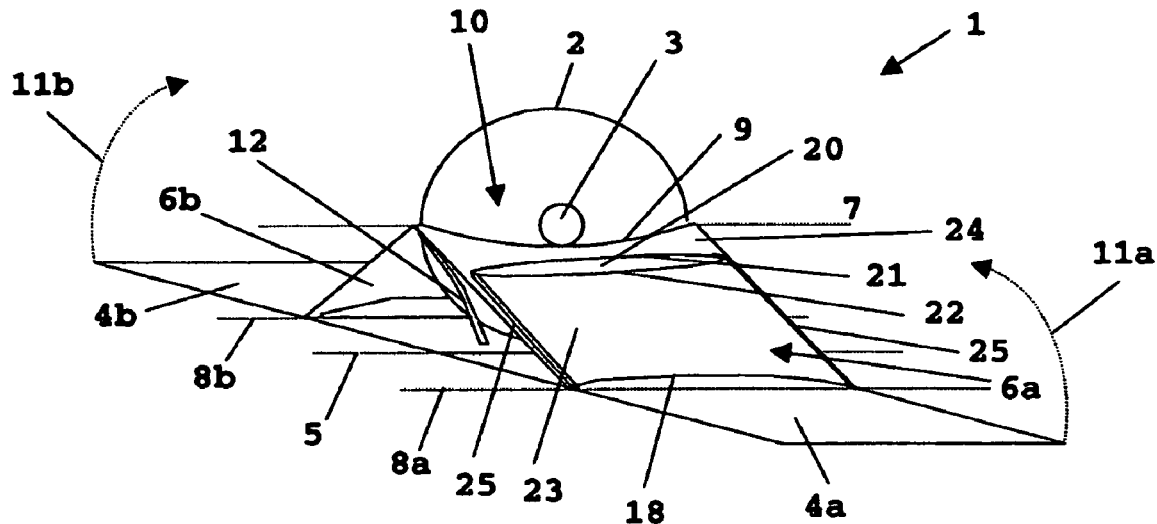
Figure 9:
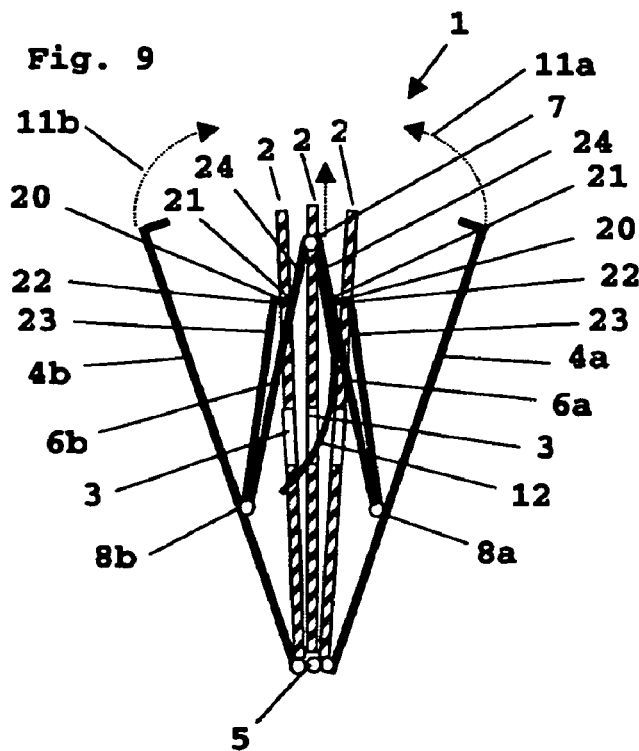

FIG. 8 depicts a perspective view of a further version of a protective case 1 in accordance with the invention. In FIG. 9, this version is shown in side view.

In these versions, data carriers 2 can be accommodated and held in position by additional openings 20 in one or both storage components 6a/6b.

In this case, the data carriers 2 come Into contact with a retainer at the back 21 and a further retainer 22 formed by recesses 23 and 24, these being constituent parts of the storage components a/b.

Recesses 23/24 may be arranged, relative to each other, at different levels of the storage components 6a/6b or, in a preferred version, be connected at the edges 25 of the storage components 6a/6b in convex and concave opposition to each other. Both versions ensure, when the data carrier 2 is Inserted, that the protective case 1 can be closed without difficulty and that the data storage area of the data carrier 2 is protected.

Needless to say, an arrangement of openings 20 for data carriers 2 can also be made without the central insertion opening 10 in axis 7.

It should be explained that the term "axis" is used throughout this document in the sense that parts are hinged relative to each other along this imaginary line. Technically speaking, an axis of this type can also be formed of one or more elements, e.g. hinges, lying outside the said imaginary line (axis).

I claim:

1. A protective case for disc-shaped data carriers, the case comprising:
   a first side component and a second side component hinged relative to each other about a first axis for movement between an open state and a closed state, wherein the first and second side components are configured to enclose a plurality of data carriers in the closed state and, through movement of the first and second side components about the first axis, the protective case is brought into the open state in which the plurality of data carriers can be removed from the case, the plurality of data carriers being held in an inclined position relative to the first and second side components and where at least a portion of each of the plurality of data carriers is accessible from both sides of the respective data carrier;
   a first storage component and a second storage component, the first and second storage components being hinged to one another about a second axis, wherein the first and second storage components define a first insertion opening along the second axis for holding a first one of the plurality of data carriers in an inclined position extending radially with respect to the first axis when the protective case is in the open state;
   wherein the first storage component is hinged to the first side component about a third axis and the first storage component is substantially planar between the second axis and the third axis, the first storage component including a second insertion opening between the second axis and the third axis for holding another of the plurality of data carriers in an inclined position extending radially with respect to the first axis when the protective case is in the open state;
   wherein the second storage component is hinged to the second side component about a fourth axis and the second storage component is substantially planar between the second axis and the fourth axis, the second storage component including a third insertion opening between the second axis and the fourth axis for holding another of the plurality of data carriers in an inclined position extending radially with respect to the first axis when the protective case is in the open state;
   wherein the first, second, third and fourth axes are parallel to each other.

2. The protective case of claim 1, wherein the first, second and third insertion openings move relative to a corresponding data carrier when the protective case is opened and closed.

3. The protective case of claim 1, wherein the insertion openings are configured to provide access to two sides of a central area of a respective data carrier held in the insertion opening when the data protective case is in the open state.

4. The protective case of claim 1, wherein the first, second and third insertion openings is substantially elliptically shaped.

5. The protective case of claim 1, further comprising retainers disposed and structured to restrict movement of the data carriers between the first and second storage components.

6. The protective case of claim 1, wherein the first, second and third insertion openings can each accommodate a plurality of data carriers.

7. The protective case of claim 1, the first and the second storage components form an isosceles triangle with a portion of the first side component extending between the first axis and the third axis and a portion of the second side component extending between the first axis and the fourth axis when the case is in the open position.

8. The protective case of claim 1, wherein the third axis and the fourth axis are spaced from the first axis by a first distance and the third axis and the fourth axis are spaced from the second axis by a second distance, wherein the first distance is less than the second distance.

* * * * *